US006246991B1

(12) United States Patent
Abe et al.

(10) Patent No.: US 6,246,991 B1
(45) Date of Patent: Jun. 12, 2001

(54) WILL INFORMATION MANAGEMENT AND DISCLOSURE SYSTEM AND METHOD, AND PROGRAM STORAGE MEDIUM THEREOF

(75) Inventors: Yukinobu Abe, Toyonaka; Yoshio Araki, Suita; Hiroshi Katagiri, Kawasaki; Shoichi Ninomiya, Kanazawa, all of (JP)

(73) Assignee: PFU Limited, Kahoku-gun (JP)

( * ) Notice: Subject to any disclaimer, the term of this patent is extended or adjusted under 35 U.S.C. 154(b) by 0 days.

(21) Appl. No.: 08/950,793

(22) Filed: Oct. 15, 1997

(30) Foreign Application Priority Data

Oct. 15, 1996 (JP) .................................................. 8-272217
Sep. 26, 1997 (JP) .................................................. 9-261198

(51) Int. Cl.[7] ...................................................... G06F 17/60
(52) U.S. Cl. ..................................... 705/1; 705/4; 705/26; 705/27; 380/4; 380/23; 380/24; 380/25
(58) Field of Search ................................. 705/1, 30, 3, 4, 705/26, 27, 28, 29; 380/4, 23, 24, 25

(56) References Cited

U.S. PATENT DOCUMENTS 5,241,466 * 8/1993 Perry et al. .............................. 705/30
5,651,117 * 7/1997 Arbuckle ................................... 705/4
5,862,223 * 1/1999 Walker et al. ............................ 705/1

FOREIGN PATENT DOCUMENTS

WO 93/00643   1/1993  (WO).

OTHER PUBLICATIONS

OnlineLaw, Inc, "American Wills created Online", webpage http://www.willworks.com, 1998.*
LawDoc Pty, "Online Australian Wills and Legal Testaments", webpage http://www.lawdoc.com.au, Aug. 1998.*
Chris Economou, "Make a Will Online", webpage http://www.oktrust.com/will.html, 1998.*
Castleman Law Firm, Wills on the Web, http://www.ca-probate.com/wills.htmt, Jan. 1997.*
Waegemann, C. Peter, "Principles of Documentation", Database Inspec 'Online! Institute of Electrical Engineers, Database accession No. 2895384 International Conference on Computerization of Medical Records, San Francisco, CA. USA, 25–27, Jun. 1986, p. 4.
Levin, A. "Document Management and the World Wide Web", Managing Office Technology, vol. 41, No.5, May 1996, pp. 47–49.

* cited by examiner

*Primary Examiner*—James P. Trammell
*Assistant Examiner*—Nga B. Nguyen

(57) ABSTRACT

A will information management and disclosure system keeps in custody deposit information that includes information about a depositor's last word and testament to be unsealed in accordance with unsealing conditions registered in advance by the depositor and disclosed to predetermined recipients, unseals the deposit information under predetermined unsealing conditions. The system comprises a depositor's terminal for entering as electronic information the deposit information prepared by the depositor in a rewritable manner, and a host processing system. The host processing system comprises an electronic information depositing part for keeping in custody the entered electronic information in accordance with predetermined depositing conditions, an unsealing part for unsealing the deposit information in accordance with predetermined unsealing conditions, and a recipient-specified delivery part for disclosing the deposit information to recipients designated in advance by the depositor and satisfying predetermined conditions, using predetermined means.

33 Claims, 15 Drawing Sheets

FIG. 11
| NO. OF RECIPIENTS | | |
|---|---|---|
| CONTENTS OF PUBLIC DISCLOSURE INFORMATION | TYPE OF INFORMATION | DELIVERY MEDIUM |
| RECIPIENT 1 | | |
| DISCLOSURE CONDITIONS 2 | | |
| DATA LINK | | |
| | | |
| CONTENTS OF PUBLIC DISCLOSURE INFORMATION | TYPE OF INFORMATION | DELIVERY MEDIUM |
| RECIPIENT 1' | | |
| DISCLOSURE CONDITIONS 2' | | |
| DATA LINK | | |
TO RECIPIENT 1     7-A
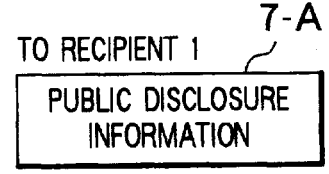
TO RECIPIENT 1'    7-B
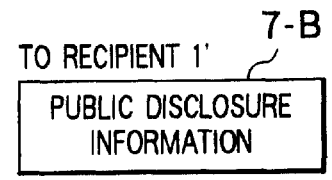

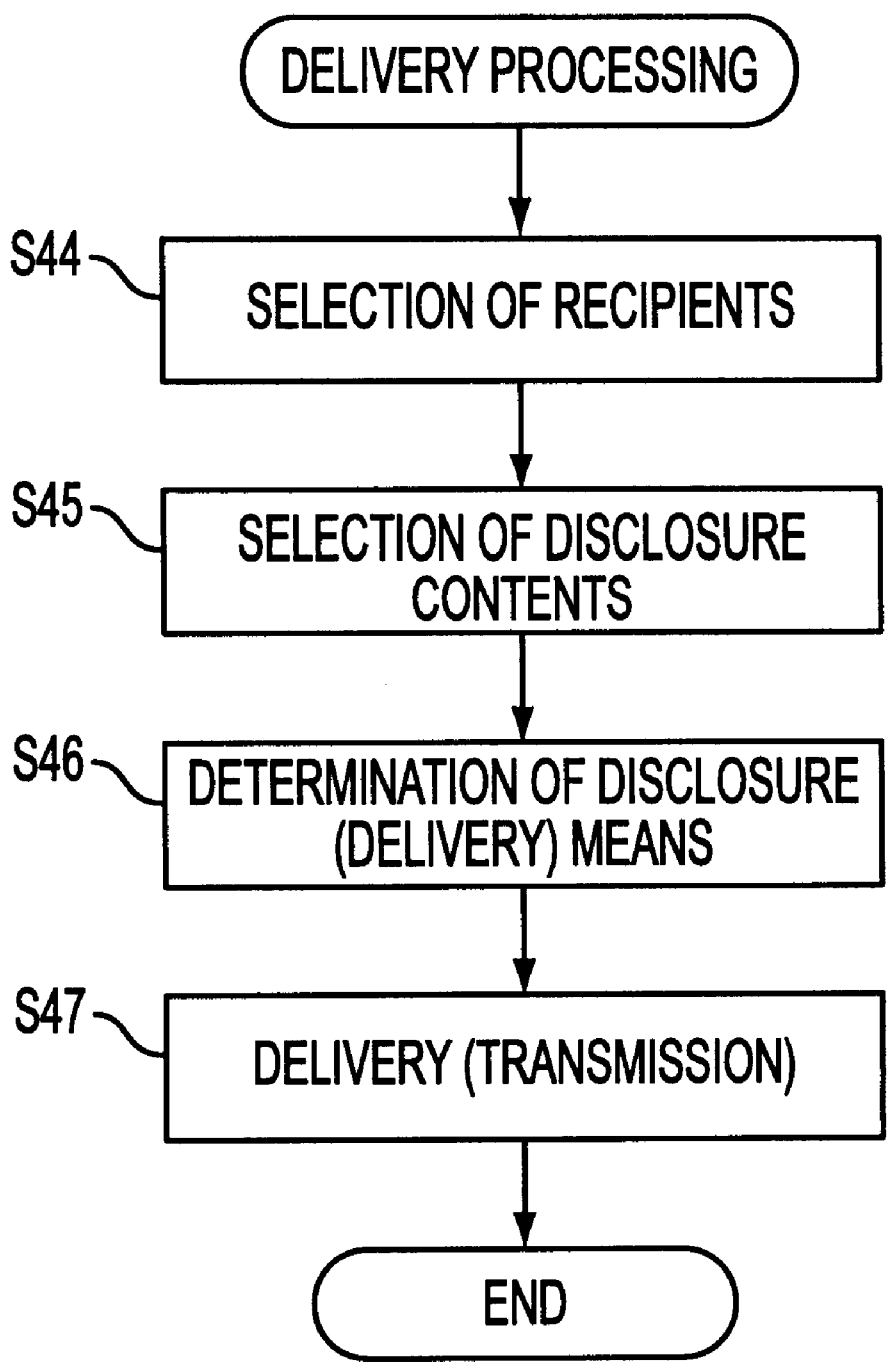

FIG. 14

| CONTENTS OF PUBLIC DISCLOSURE INFORMATION | TYPE OF INFORMATION | DELIIVERY MEDIUM | NECESSARY INFORMATION ON RECIPIENT |
|---|---|---|---|
| • NOTIFICATION OF THE EXISTENCE/ ABSENCE OF THE INFORMATION<br><br>• NOTIFICATION OF THE INFORMATION | PRINTED MATTER | MAIL SERVICE | ADDRESS |
| | ELECTRONIC INFORMATION | ELECTRONIC MAIL | TYPE OF ELECTRONIC MAIL (E-MAIL ON THE INTERNET OR ON-LINE SERVICES, etc.), RECIPIENTS' ID NUMBERS |
| | | FAX | FAX NO. |
| | | OTHERS | |

WILL INFORMATION MANAGEMENT AND DISCLOSURE SYSTEM AND METHOD, AND PROGRAM STORAGE MEDIUM THEREOF

BACKGROUND OF THE INVENTION

This invention relates generally to a will information management and disclosure system, and more particularly to a will information management and disclosure system and method, and the program storage medium thereof wherein a depositor deposits deposit information, including will information, under a predetermined contract, and the deposit information is opened and disclosed when the depositor has become unable to express his/her intentions due to death or for other reasons.

It has heretofore been widely practiced that the information stored in a rewritable manner in a data processing system is kept in custody and managed, and rewritten or output by an authorized person. It has also been practiced that an individual operating a terminal retrieves desired information stored at a remote location via the Internet using the terminal.

With the advent of the age of aging society, an increasing number of people have a desire to live a comfortable and affluent life in their old age. Furthermore, there also are an increasing number of people, not only elderly people but ordinary people who want to keep information in advance in someone's custody and disclose the deposited information to an extent that is determined by predetermined conditions to persons designated in advance, using predetermined disclosure means, after their death, or when they have become unable to express their intentions due to an illness.

SUMMARY OF THE INVENTION

It is therefore an object of the present invention to provide a will information management and disclosure system and method in which the confidentiality of deposited information is removed (unsealed) only after a depositor's death, so that the deposited information can be disclosed to a predetermined person (including the general public).

It is another object of the present invention to provide a program storage medium for realizing a will information management and disclosure system and method in which the confidentiality of deposited information is removed (unsealed) only after a depositor's death, so that the deposited information can be disclosed to a predetermined person (including the general public).

The will information management and disclosure system according to the present invention keeps the information deposited by a depositor in custody, and unseals the deposited information under predetermined conditions. The deposited information is the information, including will information, that can be disclosed under unsealing conditions registered in advance by the depositor and/or when the depositor has become unable to express his/her intentions.

The will information management and disclosure system according to the present invention has a depositor's terminal and a host processing system for keeping in custody and opening deposited information. The depositor's terminal enters as electronic information the information prepared by the depositor for depositing purpose in a rewritable manner. The host processing system comprises an electronic information depositing part for keeping in custody the entered electronic information in accordance with predetermined depositing conditions; an unsealing part for unsealing the deposited information using a predetermined unsealing electronic key, the unsealing part having first confirming means for confirming the establishment of predetermined unsealing conditions and second confirming means for confirming that the depositor has become unable to express his/her intentions; and a recipient-specified delivery part for delivering the deposited information for disclosure using predetermined means to persons designated in advance by the depositor who satisfies predetermined conditions.

The will information management and disclosure method according to the present invention comprises a step of entering information as electronic information from the depositor's terminal, a step of keeping in custody the electronic information entered into the host processing system in accordance with predetermined depositing conditions, a step of unsealing the deposited information using a predetermined unsealing electronic key when it has been confirmed that the predetermined unsealing conditions have been established, and a step of delivering the deposited information for disclosure using predetermined means to persons designated in advance by the depositor who satisfies the predetermined conditions.

The present invention provides a program storage medium that stores a program for implementing the aforementioned will information management and disclosure system and the aforementioned will information management and disclosure method.

BRIEF DESCRIPTION OF THE DRAWINGS

FIG. 11 is a diagram of assistance in explaining the state of information disclosure in accordance with prescribed disclosure procedures.

FIG. 13 is a flow chart of information delivery.

FIG. 14 is a diagram of assistance in explaining the control of information disclosure.

DETAILED DESCRIPTION OF THE PREFERRED EMBODIMENTS

Figure 1:
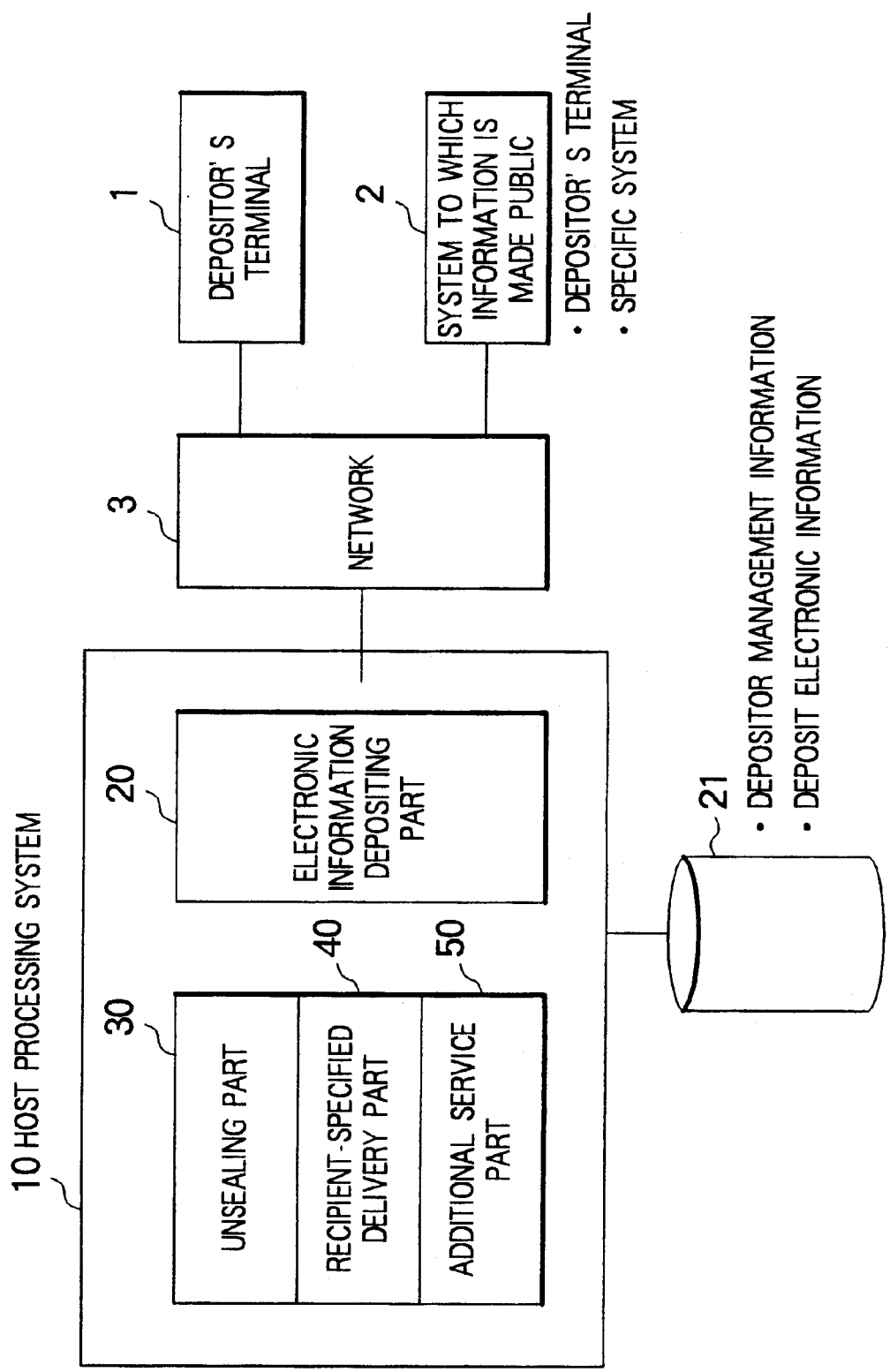
FIG. 1 is a block diagram illustrating the operating principle of the present invention.

FIG. 1 is a block diagram illustrating the operating principle of the present invention. In the figure, reference numeral 1 denotes a depositor's terminal, 2 a system to which information is made public, 3 a network, 10 a host processing system, 20 an electronic information depositing part, 21 a memory, 30 an unsealing part, 40 a recipient-specified delivery part, and 50 an additional service part, respectively.

A depositor who wants to deposit information to the system enters information under a predetermined contract, using the depositor's terminal 1. That is, the depositor who reads and understands the contents of a contract document displayed on the system display enters into the system various pieces of information, including (1) a death notice of his/her own,
(2) a last will and testament,
(3) gratitude to those who extended assistance,
(4) a roundup of his/her own life,
(5) reflection, repentance, confession of his/her own life,
(6) publication of his/her posthumous works, such as diary, essays, photographs, etc., and
(7) messages to the next generations, together with image information for depositor authentication, in accordance with a predetermined format (in accordance with a predetermined format while following guidance given on the display) while describing in a description pre-designated recipients, the extent of information to be disclosed that is determined under predetermined conditions, predetermined disclosure means, an electronic key for the depositor to unseal the information for rewriting, etc.

The deposit information thus entered is transmitted to the host processing system 10 via the network 3, such as the Internet, and stored in the memory 21 of the electronic information depositing part 20. Needless to say, the deposit information is subjected to strict encryption when the depositor uploads it on the network 3 from the depositor's terminal 1, or when the deposit information is processed in the host processing system 10 or downloaded from the host processing system 10 via the network 3.

The unsealing part 30 unseals the deposit information only when the depositor wants to rewrite the information using a predetermined electronic key, or when the depositor died or has become a vegetable, unable to express his/her intentions.

The recipient-specified delivery part 40, when the deposit information is unsealed after it has been confirmed that the depositor has become unable to express his/her intentions, determines which part of the unsealed deposit information is disclosed when and by what disclosure means to what range of recipients.

The additional service part 50 has a library that is instrumental in studying reference information, such as judicial precedents and other persons' posthumous works, when preparing the deposit information. The additional service part 50 also provides a privileged e-mail legal advice service in which members can receive legal advice from lawyers when preparing and depositing deposit information.

The will information management and disclosure system shown in FIG. 1 is implemented using a program for operating a computer, as described above. The program is stored in an appropriate storage medium.

Figure 2:
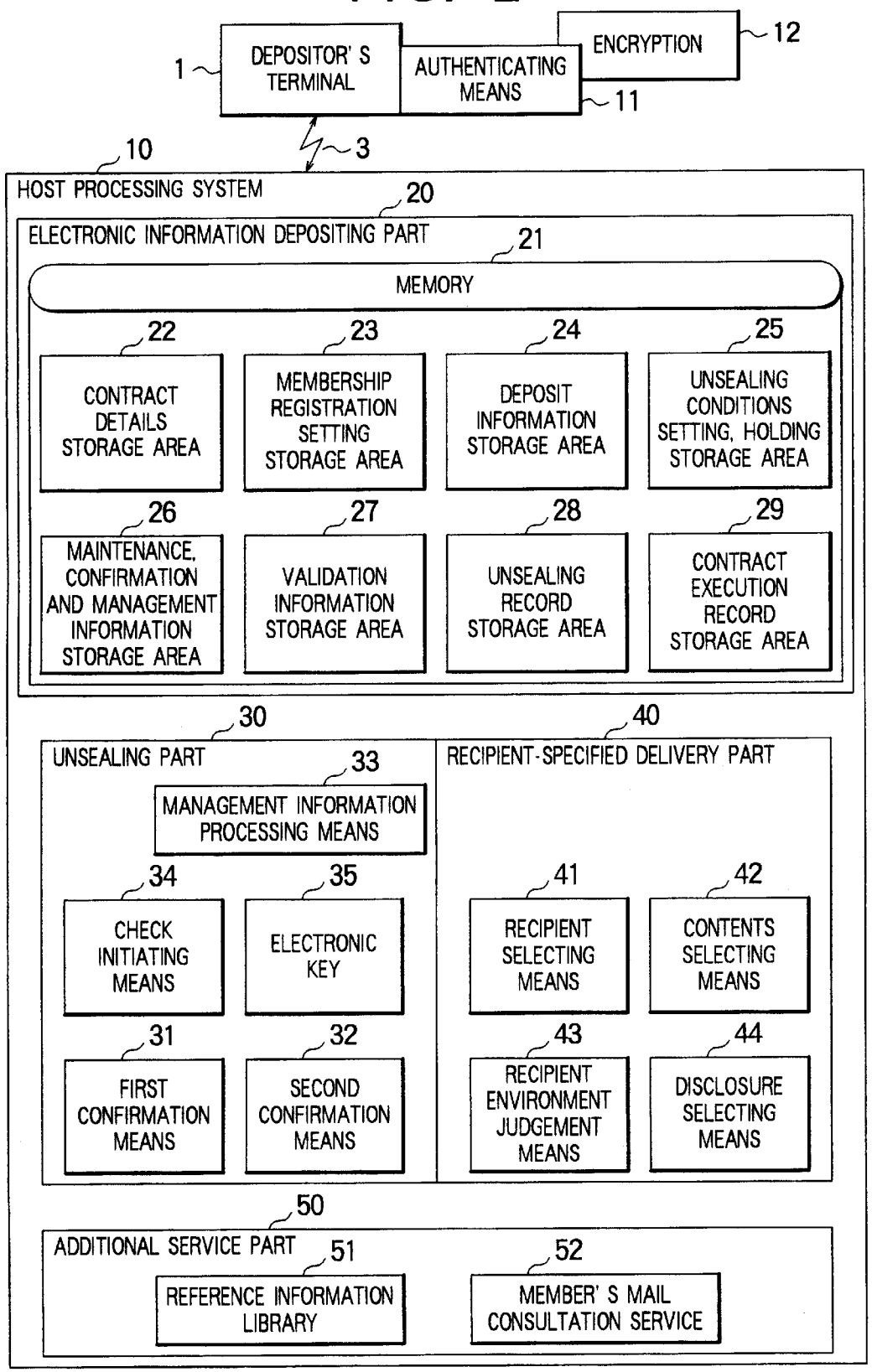
FIG. 2 illustrates the construction of an embodiment of the present invention.

FIG. 2 shows the configuration of an embodiment of the present invention. In the figure, reference numerals 1, 3, 10, 20, 21, 30, 40 and 50 correspond to those used in FIG. 1.

Reference numeral 11 denotes depositor authentication means for authenticating that an operator who deposits and/or rewrites deposit information using the depositor's terminal 1 is the authorized depositor. The depositor authentication means 11 may be provided in the host processing system 10 on the opposite side of the network 3 to identify and authenticate an operator by operating keys on the depositor's terminal.

Authentication is carried out by preparing authentication information with a fingerprint, voiceprint, or retina print, or using a combination of an insurance card, cash card or electronic medical record, and an autograph or password. Once registered in the system, the authentication information stored in the system is used to compare with the information entered by an operator from the keyboard on the depositor's terminal.

Numeral 12 in the figure denotes an encryption (decryption) part for enciphering the deposit information entered by a depositor and transmit it to the host processing system 10, and/or deciphering the enciphered deposit information transmitted from the host processing system 10 to enable the depositor to get access to it. It would be preferable to assign a different encryption key to each depositor and to have he or she memorize it. The system reads the key to allow access to the deposit information only after the depositor died or has become unable to express his/her intentions.

When the depositor deposits information, the host processing system 10 displays a deposit contract document on the display of the depositor's terminal 1. The depositor authenticates his/her identity, agrees to the contract provisions, and enters necessary information.

The deposit information includes the following items:
(1) the name and address of the depositor,
(2) the password, membership number, etc. of the depositor,
(3) the contents of disclosure (including opening to the public),
(4) the names and addresses of recipients,
(5) the range of disclosure specified for each recipient,
(6) disclosure conditions specified for each recipient,
(7) the time of disclosure specified for each recipient,
(8) the method (means) of disclosure specified for each recipient—mail, courier service, disclosure via electronic media, broadcast, etc.
(9) Authentication—inputs to verify that the deposit information is prepared and entered by the authorized depositor, such as an autograph, or a combination of a fingerprint, voiceprint, retina print, seal with an autograph (those are displayed on a disclosed document in the form of images), and
(10) the electronic key used by the depositor to unseal the deposit information.

The deposit information is not limited to character information, but may be video or audio records since the system accommodates the so-called multimedia information. The contents of deposit information may include not only one's last will and testament but also the depositor's autobiography and various records the depositor wants to disclose only after his/her death.

The host processing system 10 includes (I) the electronic information depositing part 20, (ii) the unsealing part 30, (iii) the recipient-specified delivery part 40, and (iv) the additional service part 50.

I. The electronic information depositing part 20 carries out processing to manage and keep in custody the deposit information entered from the depositor's terminal 1. The information necessary for the part 20 is stored in the memory 21.

A contract details storage area 22 in the figure is an area for storing the details of the contract concluded with the depositor. A membership registration storage area 23 is an area for storing the name, address, password, membership number, etc. of each depositor.

A deposit information storage area 24 is an area for storing the deposit information itself. An unsealing conditions setting, holding and storage area 25 is an area for storing an electronic key used by the depositor to unseal the registered deposit information to read or rewrite it, and also for storing in advance the conditions for unsealing the deposit information after the depositor died or has become a vegetable or been taken with a senile dementia.

A maintenance, confirmation and management information storage area 26 is an area for storing maintenance and management information, including whether the charges for maintaining and managing deposit information are paid. It also is an area for storing status information, such as the mailing of demand notes when the maintenance charges are unpaid, and correspondences from the depositor in connection with the unpaid charges.

A validation information storage area 27 is an area for storing information on the validity of the contents of the maintenance, confirmation and management information storage area 26. It is provided to prevent the contents of the maintenance, confirmation and management information storage area 26 from being rewritten unwantedly.

An unsealing record storage area 28 is an area for storing the record of the process of reading or rewriting deposit information by the depositor. The unsealing record storage area 28 also stores the record of the process of unsealing the deposit information when the depositor has become unable to express his/her intentions.

A contract execution record storage area 29 is an area for storing the record of various processes (for disclosure) carried out in accordance with the contract after the deposit information has been unsealed.

When the depositor deposits information by operating the depositor's terminal 1, the electronic information depositing part 20 displays the contents of the contract details storage area 22 to the depositor. Although the details of the contract may be rewritten, or deleted, or added appropriately by the operation of the keyboard by the depositor, in such a case, prior consultation with the responsible person for the system is required.

Once a contract is concluded, the depositor enters the aforementioned authentication information and then deposit information. During that time, the electronic information depositing part 20 stores the details of the contract in the storage area 22, authentication information in the storage area 23, the deposit information in the storage area 24, and the electronic key, etc. in the storage area 25.

The electronic information depositing part 20 stores management information in the maintenance, confirmation and management information storage area 26, describes the effective flag, etc., and also describes process records in the contract execution record storage area 29.

When the depositor reads or rewrites the already deposited information, the electronic information depositing part 20, in conjunction with the unsealing part 30, unseals the contents of the deposit information storage area 24 to transmit to the depositor's terminal 1.

When the depositor has rewritten the deposit information, the rewritten deposit information is stored in the storage area 24, and the deposit information before rewriting is also saved. The intervening process is stored as records in the maintenance, confirmation and management information storage area 26, the validation information storage area 27, the unsealing record storage area 28 and the contract execution record storage area 29.

II. The unsealing part 30 performs necessary processing for unsealing the deposit information that is managed and kept in custody.

A first confirming means 31 checks authentication information, or whether the electronic key for unsealing is genuine, or whether unsealing by the depositor is an authorized one.

A second confirming means 32 confirms that the depositor died or has become unable to express his/her intentions due to his/her vegetable state. In such a case, a management information processing means 33 which will be described later notifies that a genuine death notice issued by an official agency or a death certificate issued by a doctor, for example, has been duly received, and that notification is compared with the contents of the aforementioned disclosure conditions setting, holding and storage area 25.

The management information processing means 33 accepts a request for unsealing by the depositor, or receives a genuine death notice issued by an official agency or a death certificate issued by a doctor. That is, the means 33 accepts, records and manages necessary management information for unsealing deposit information.

A check initiating means 34 has means for appropriately monitoring and detecting the outbreak of a state where the depositor has become unable to express his/her intentions. When the depositor's terminal is a terminal connected to the Internet, and if the depositor has not operated his/her terminal for four weeks, for example, to make contact with the system, an alarm is issued and a confirming and checking function is initiated to check his/her health or whereabouts. The information obtained from this check is transferred to the management information processing means 33.

An unsealing means 35 using an electronic key unseals the contents of the aforementioned deposit information storage area 24 using a predetermined electronic key upon completion of the confirmation by the first and second confirming means 31 and 32. As the electronic key to unseal the deposit information, an ID information, or password information is used.

Though not shown in FIG. 2, the unsealing part 30 has a function to check whether the adjustment fees for information depositing is paid off, together with the contents of the maintenance, confirmation and management information storage area 26, and to temporarily cancel the unsealing operation by the depositor using the electronic key if the adjustment fees are not paid.

Confirmation is carried out by the first and second confirming means 31 and 32 based on the instruction given by the check initiating means 34 or the information received by the management information processing means 33, and then the deposit information is unsealed by the unsealing means 35 using the electronic key. When the deposit information is unsealed base on the confirmation by the first confirming means 31, the unsealed deposit information is presented to the depositor's terminal. When the deposit information is unsealed based on the confirmation by the second confirming means, the unsealed deposit information is sent to a recipient-specified delivery part 40, which will be described later.

III. The recipient-specified delivery part 40 discloses the deposit information that was unsealed when the depositor died or has become unable to express his/her intentions.

The recipient selecting means 41 specifies persons to whom the information is to be disclosed by reading the names of designated persons to whom the information is to be disclosed (including disclosure to the general public) from among the contents of the deposit information storage area 24. The contents selecting means 42 reads the content to be disclosed in the contents of the deposit information storage area 24 and determines the extent of contents to which the deposit information is disclosed to the qualified recipient(s), using the results of judgement by a recipient's environment judgement means 43. The contents of disclosure are selected based of the results of judgement by the recipient's environment judgement means 43, depending on whether the recipient is a married person or not, for example.

A disclosure selecting means 44 determines by what means the deposit information is to be disclosed to individual recipients; by mail, or by courier service, or by broadcast, or by an electronic medium, and so on, based on the contents of the aforementioned deposit information storage area 24. In such a case, the time of disclosure to a plurality of recipients; at the same hour or on the same day, for example, is also controlled.

As described above, the recipient-specified delivery part 40 selects a recipient(s), selects the contents of disclosure by judging the environment of the recipient(s), and discloses the deposit information by the desired disclosure means at a desired time.

IV. An additional service part 50 has a reference information library 51 and a members' mail consultation service 52 to provide additional services to support information depositing by the depositor.

The reference information library 51 stores reference materials that are helpful for the depositor to deposit information, such as past judicial precedents regarding last will and testament, past case histories on information depositing, or other persons' posthumous works, so that the depositor can read them from his/her terminal 1. The members' mail consultation service 52 is designed to give legal advice when the depositor accesses the service using his/her terminal 1 for such advice.

The network 3 is shown in FIG. 2 only as a symbol of a communication line, but the network 3 is actually a network connecting to the Internet.

Figure 3:
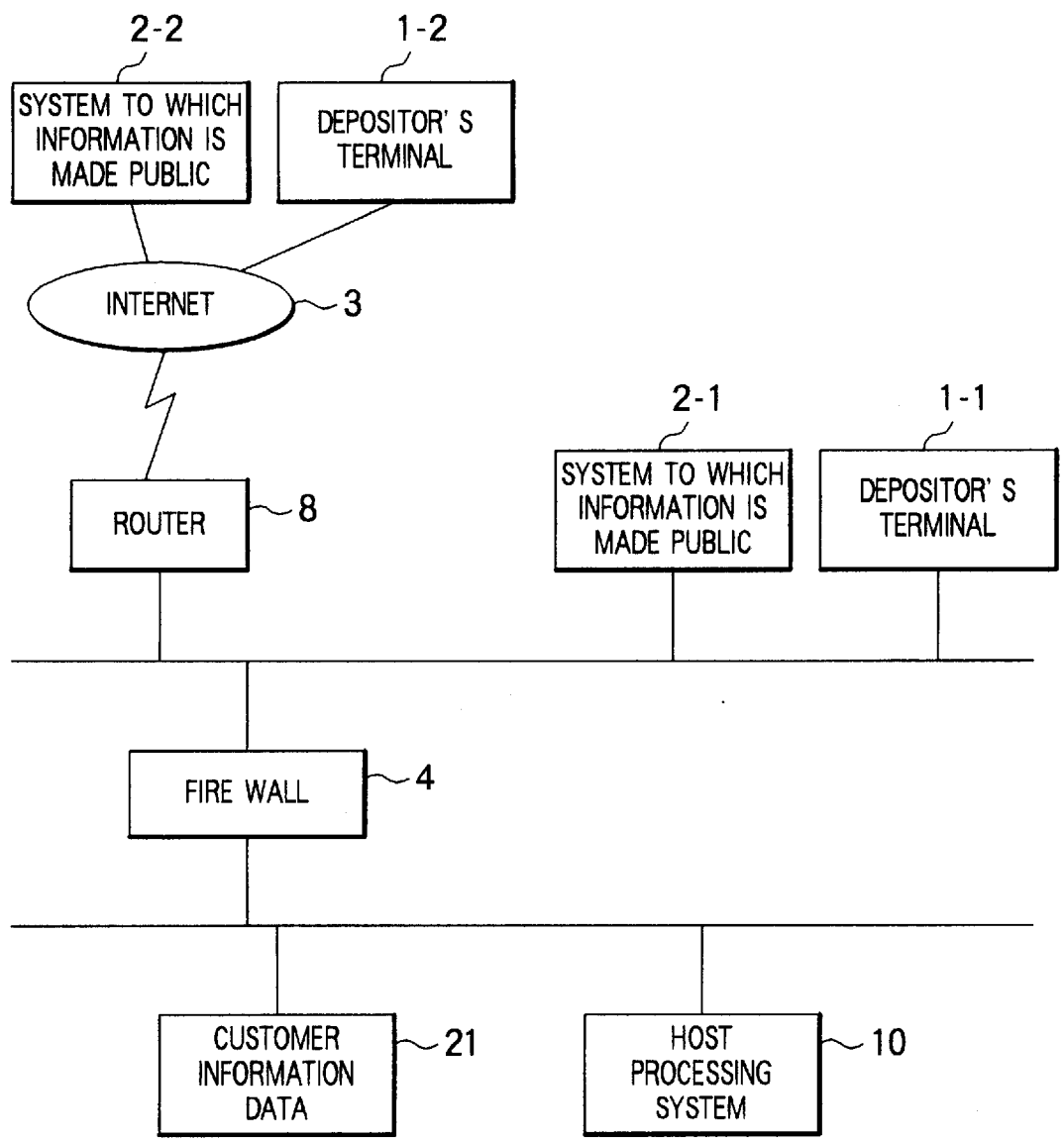
FIG. 3 is a diagram illustrating a system configuration using the Internet.

FIG. 3 shows a system configuration using the Internet. In the figure, numerals 1, 2, 3, 10 and 21 correspond to like numbers in FIG. 1. Numeral 4 denotes a fire wall, and 8 a router. The host processing system 10 is connected to a depositor's terminal 1-1 and a public disclosure system 2-1, to which deposit information is publicly announced, via a local area network, for example. The host processing system 10, and the depositor's terminal 1-1 and the public disclosure system 2-1 connected thereto are connected to the Internet 3 via a router 8. The depositor's terminal 1-2 and the public disclosure system 2-2 are connected to the host processing system 10 via the Internet 3.

The database (memory 21) for storing customer information in the host processing system 10 is protected mainly by a fire wall 4 to prevent access to the database from the outside via the Internet 3. The fire wall 4 prohibits unwanted access to customer information data (depositor management information, deposit electronic information, etc.) from the depositor's terminal 1-2 and the public disclosure system 2-2 on the side of the Internet 3. The fire wall 4 also prohibits unwanted access to customer information data from the depositor's terminal 1-1 and the public disclosure system 2-1, both of which are connected to the host processing system 10 without the intervention of the Internet 3. In this way, customer information is protected from unauthorized reference or updating. The host processing system 10 can use customer information without being prohibited by the fire wall 4 from access to it.

The will information management and disclosure system according to the present invention, such as the will information management and disclosure system shown in FIGS. 2 and 3, is realized using a program for operating the computer as described above and as will be described, referring to process flow charts in the following. This program is stored in various appropriate program storage media for storing it.

Figure 4:
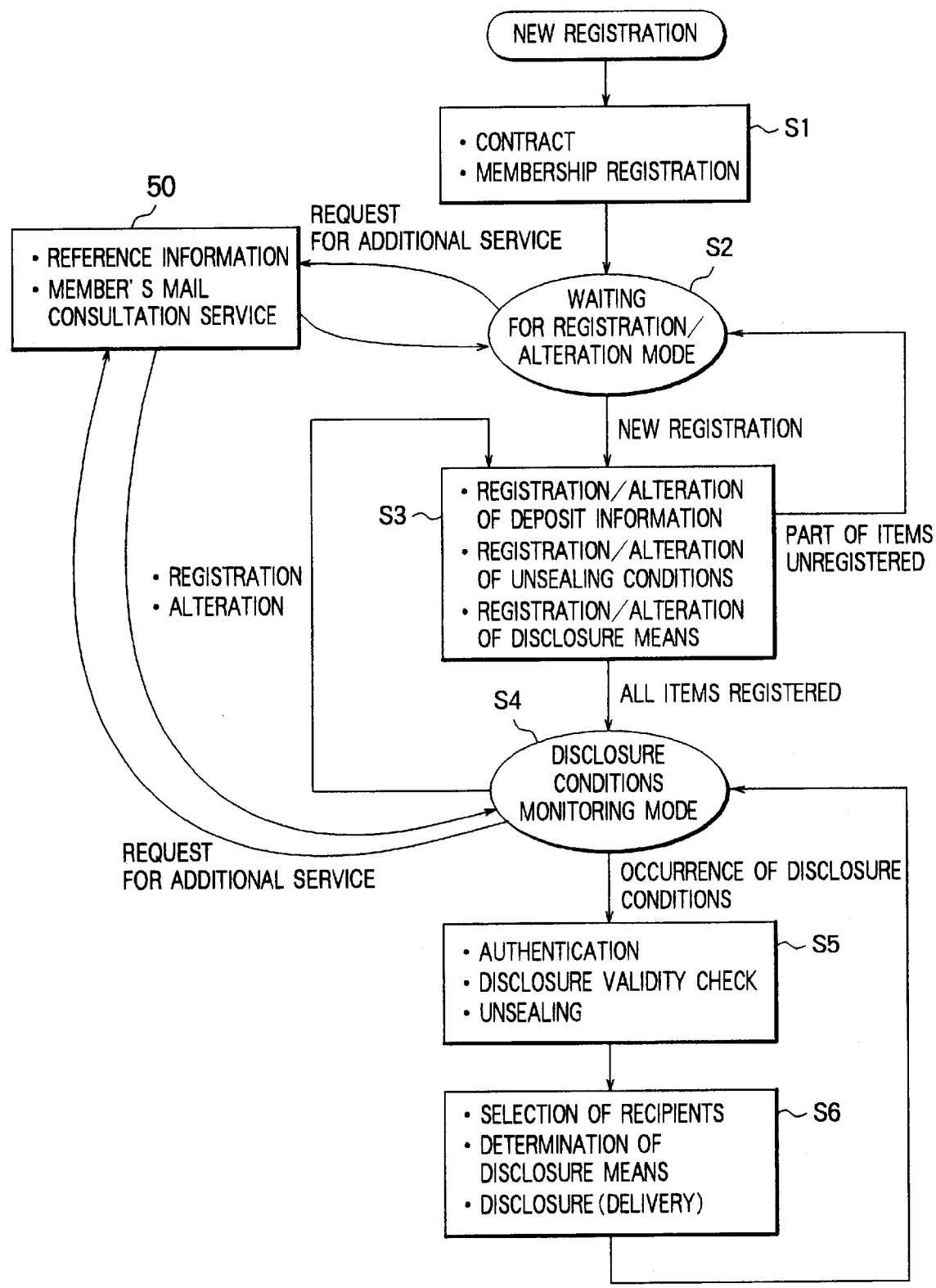
FIG. 4 is a state transition diagram of the present invention.

FIG. 4 is a state transition diagram of an embodiment of the present invention. As shown in FIG. 4 and described above, once a new registration has been made, the present invention has (i) a registration/alteration mode (Step S2), and
(ii) a disclosure conditions monitoring mode (Step S4). In both modes, members can use reference information and receive advice by electronic mails with each other as the need arises using the additional service part 50.

Figure 5:
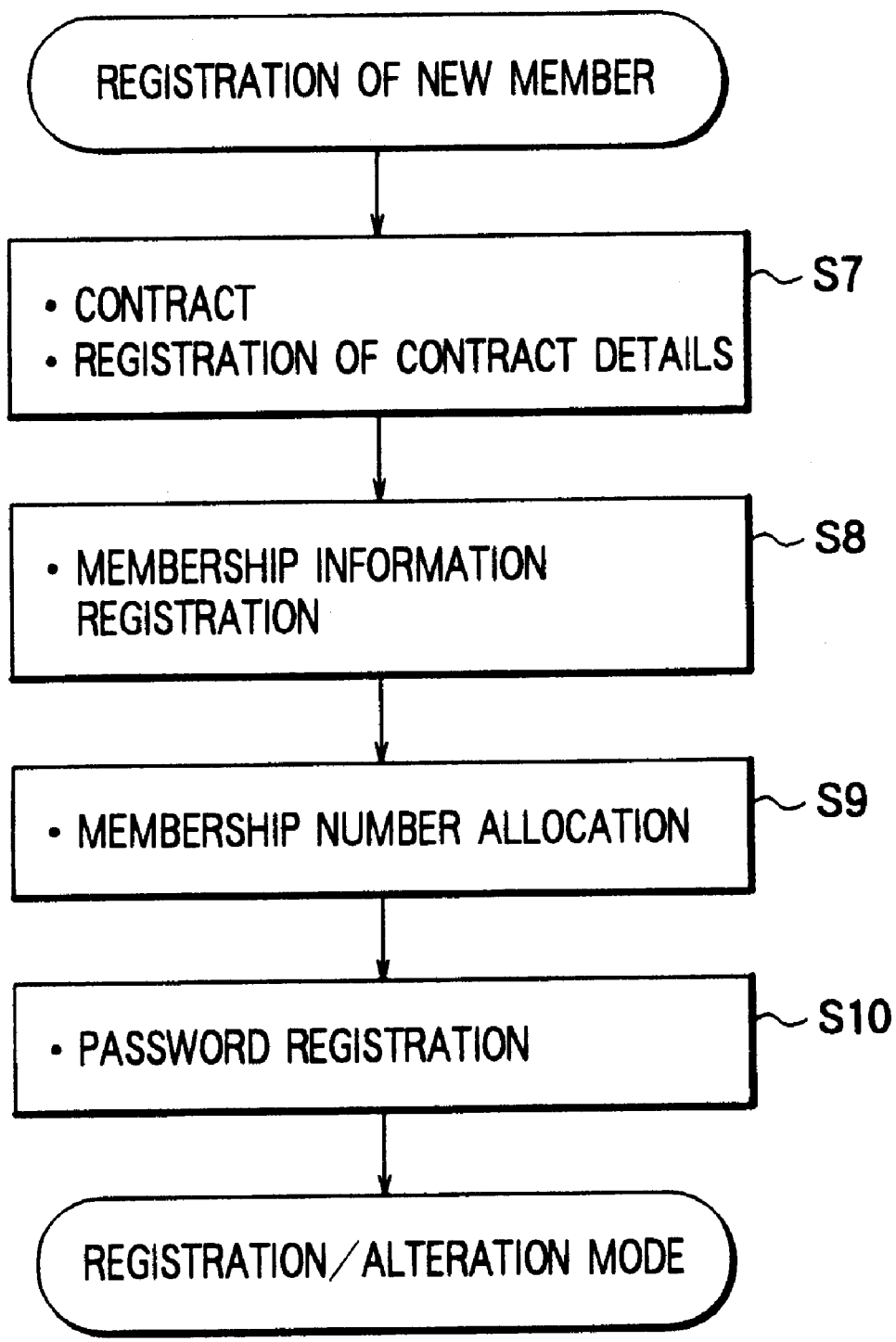
FIG. 5 is a flow chart of membership registration.

Step S1: When an instruction for a new registration is entered from a depositor's terminal 1 via the network 3, the electronic information depositing part 20 concludes a contract with the depositor and carries out membership registration. Details of this processing are shown in FIG. 5.

Step S2: After membership registration, the electronic information depositing part 20 enters into a waiting for registration/alteration mode. In this mode, the depositor can retrieve reference information and receive advice by electronic mails by making a request for additional service from the depositor's terminal to the additional service part 50, as described above. Based on the reference information, the depositor prepares deposit information, unsealing conditions, disclosure means, etc. for new registration from the depositor's terminal 1.

Figure 6:
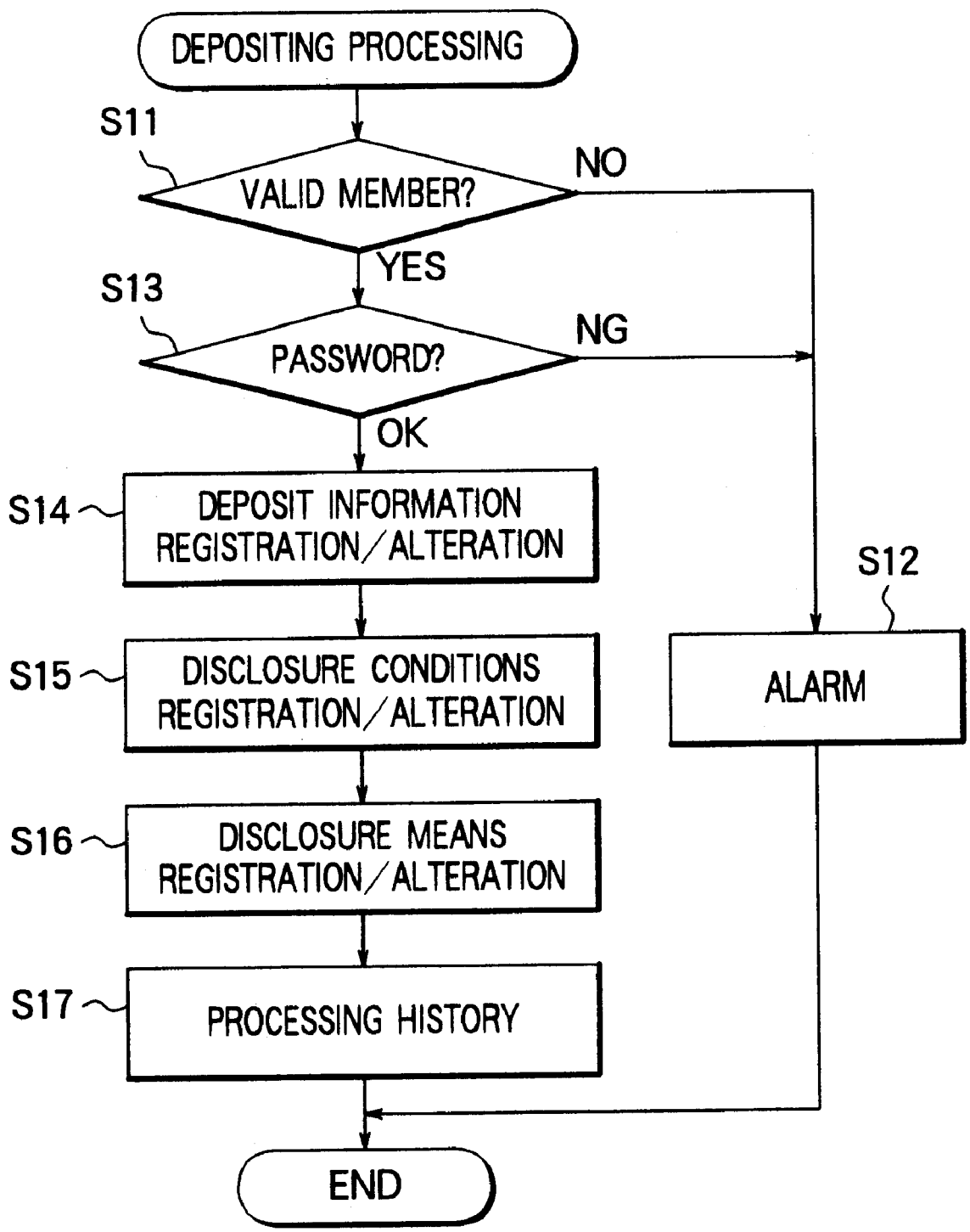
FIG. 6 is a flow chart of depositing information.

Step S3: When a new registration is entered in the waiting for registration/alteration mode, the electronic information depositing part 20 carries out depositing processing. That is, the deposit information, unsealing conditions, disclosure means, etc. entered by the depositor from the depositor's terminal are stored in the memory 21. Details of this processing are shown in FIG. 6. If part of the necessary items are not registered, the process is returned to the state of Step S2. As will be described later, alteration of the registered contents can be performed with the same processing as that for registration.

Figure 7:
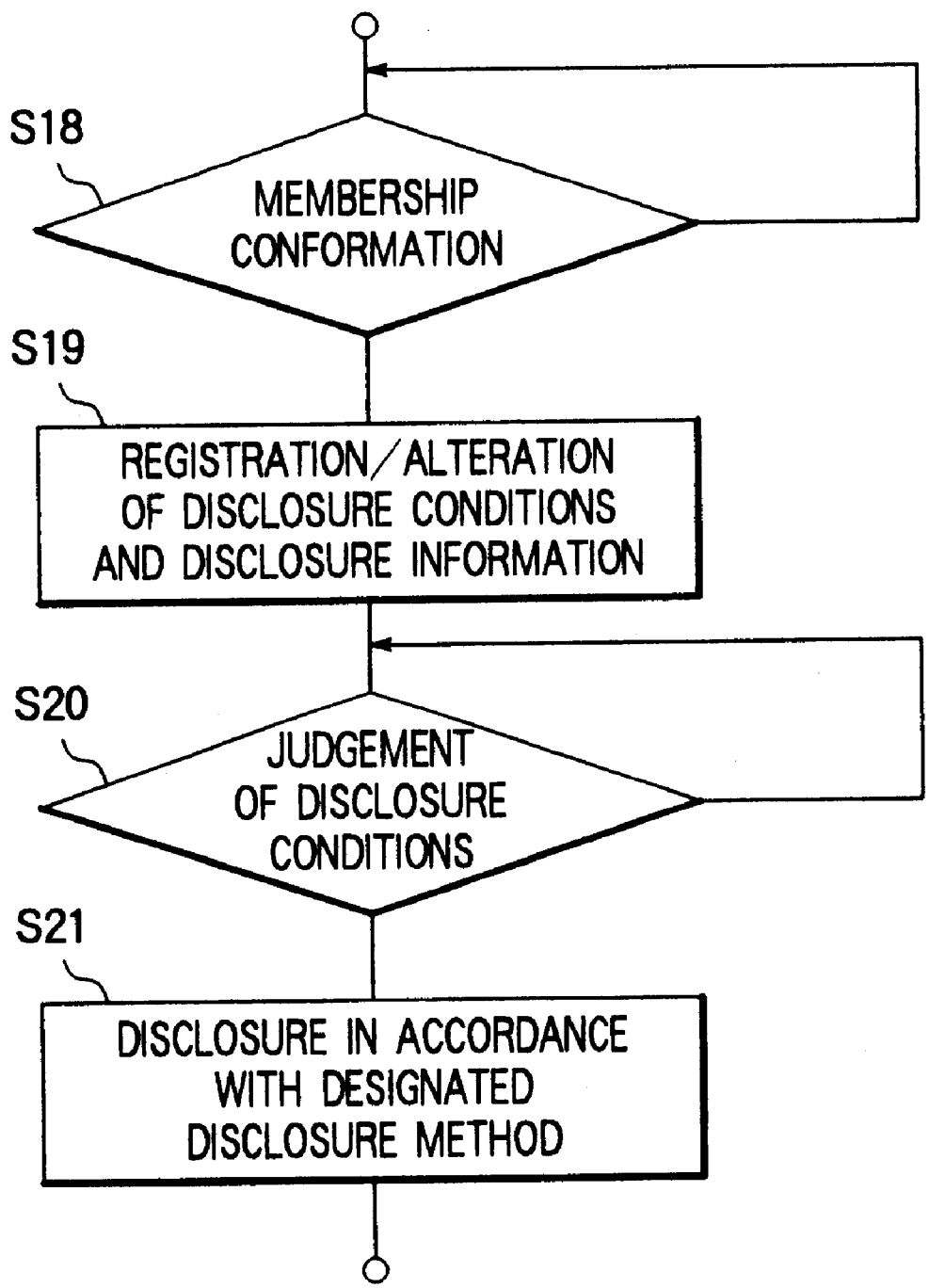
FIG. 7 is a flow chart of information disclosure.

Step S4: Once all the necessary items for depositing have been registered, the electronic information depositing part 20 enters into the disclosure conditions monitoring mode. In this mode, too, the depositor can retrieve reference information and receive advice by electronic mails by making a request for additional service. If the depositor wants to alter the deposit information registered by the depositor, necessary alteration can be performed in this mode. That is, when a change in registration is entered, the electronic information depositing part 20 returns to Step S3 to execute registration processing for that change. The outline of this processing (including the repeating of Step S3) through Step s& is shown in FIG. 7.

Figure 9:
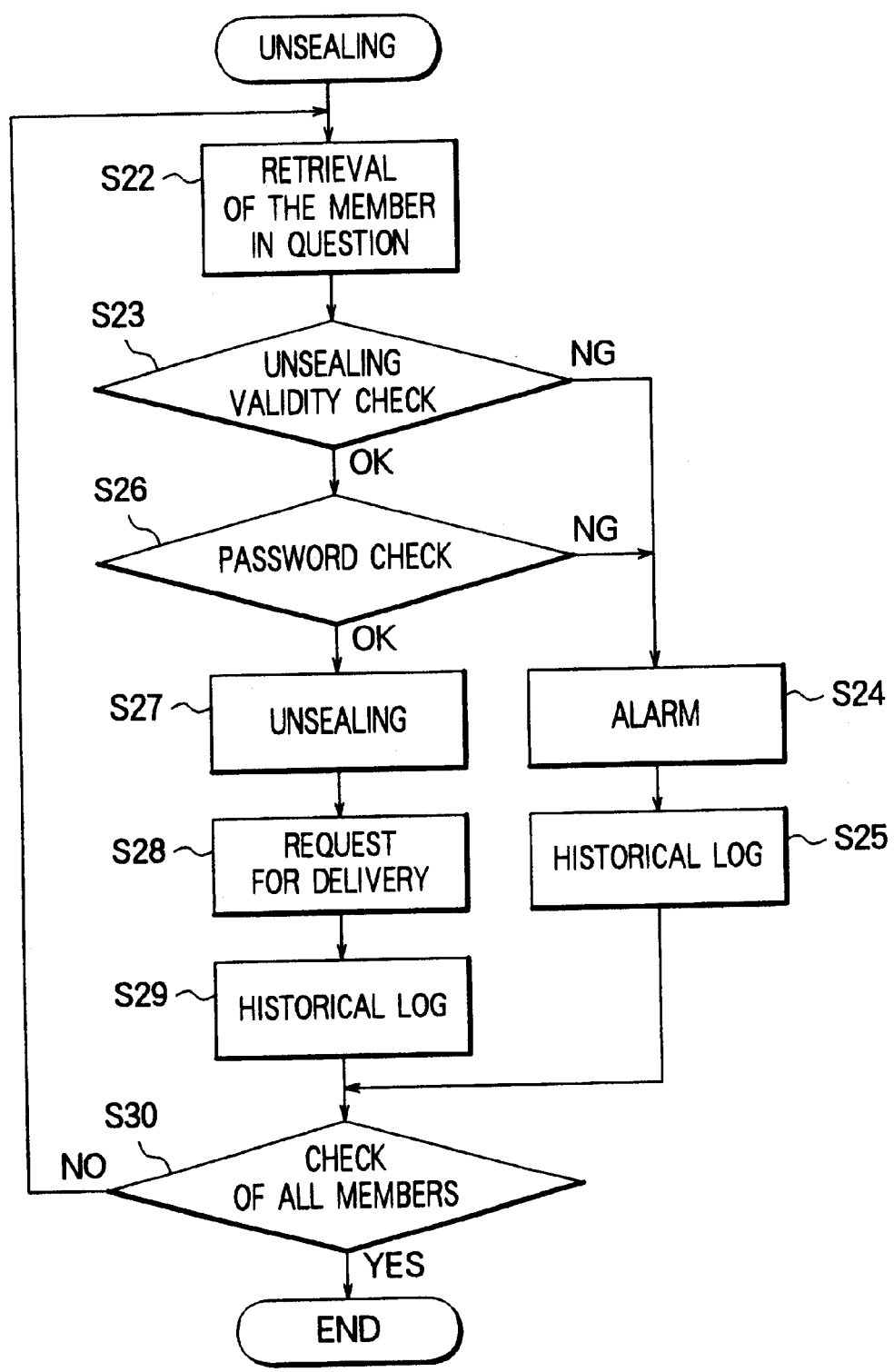
FIG. 9 is a flow chart of unsealing.
Figure 10:
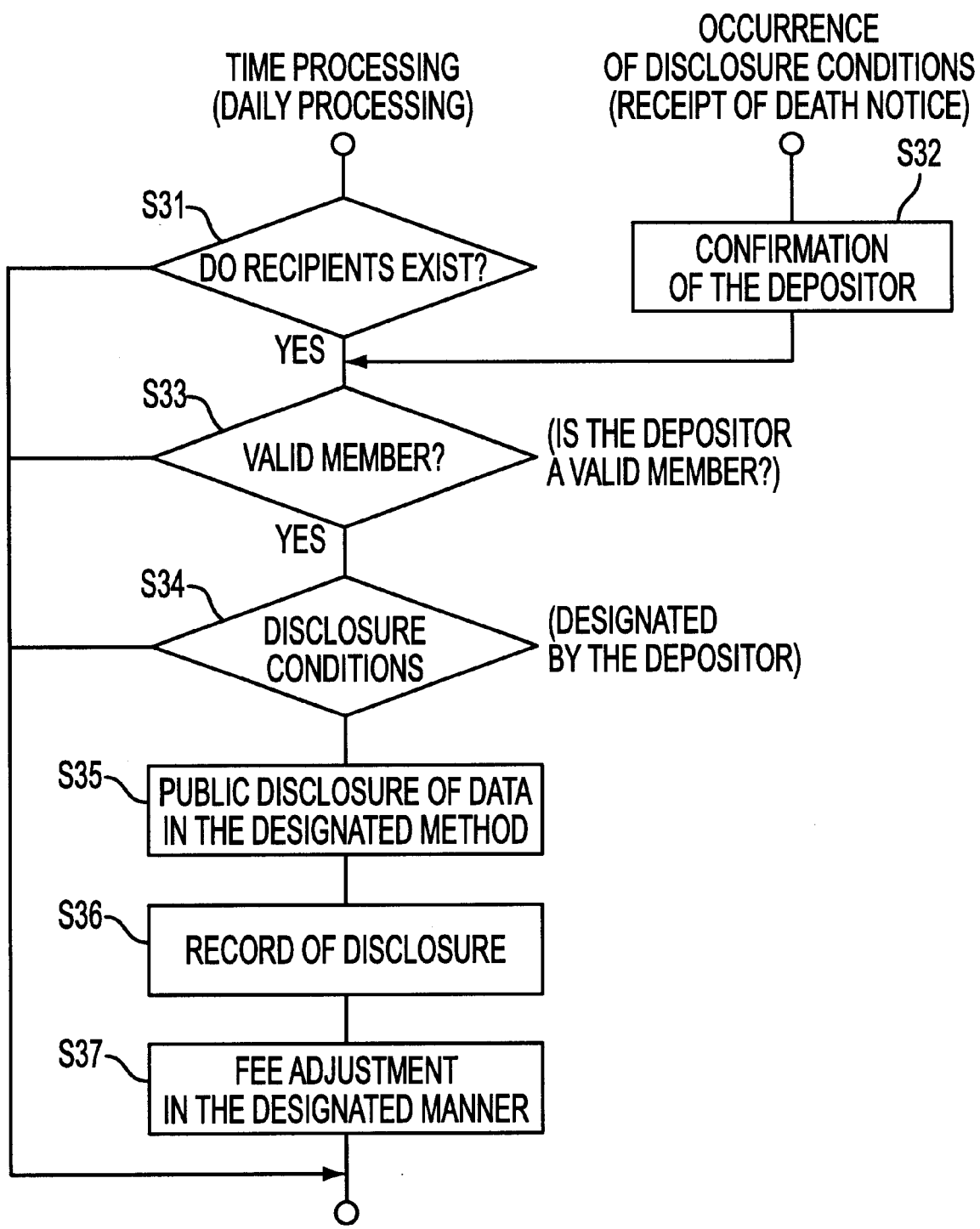
FIG. 10 is flow chart of judgement on disclosure requirements and information disclosure.
Figure 12:
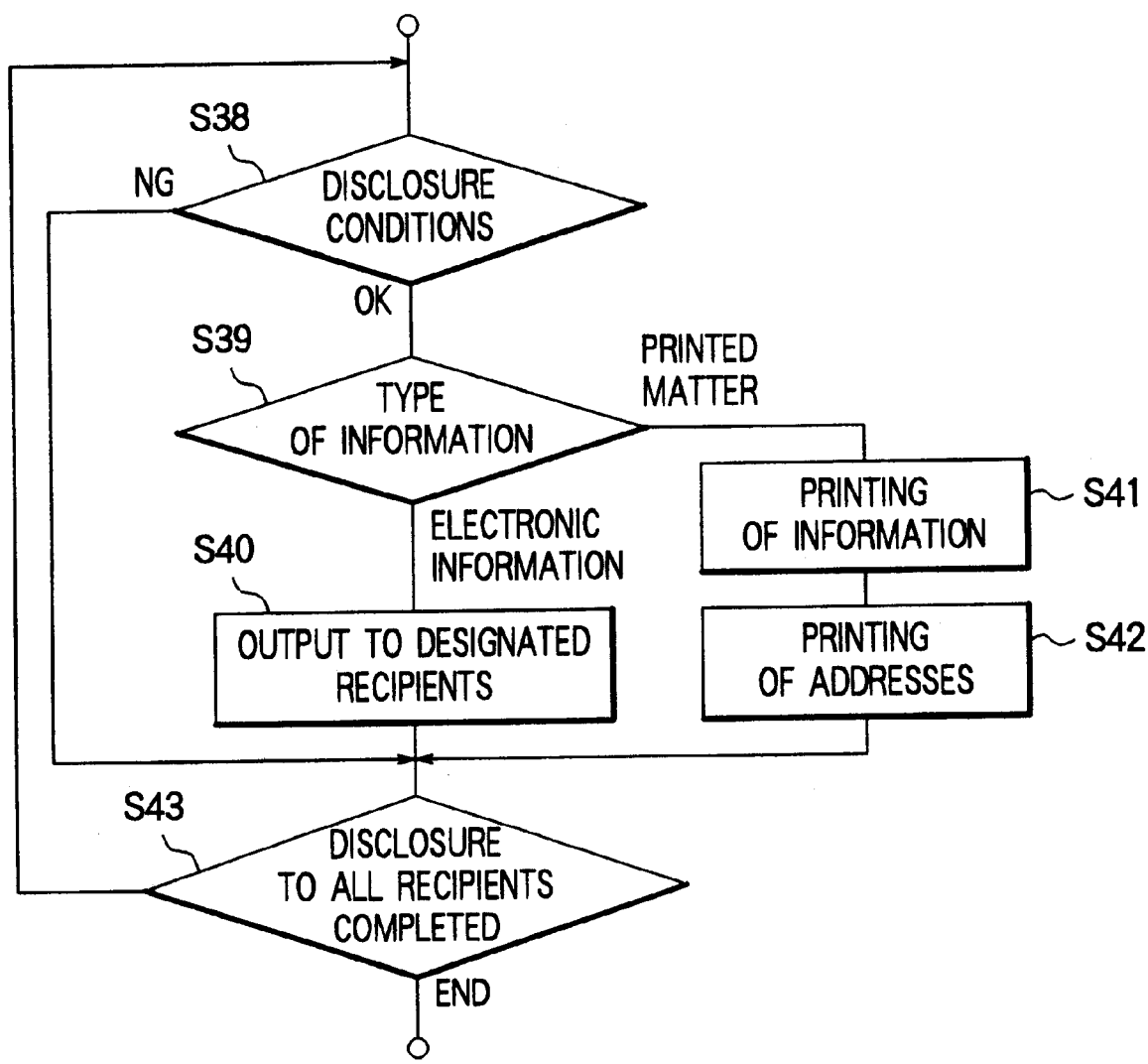
FIG. 12 is a flow chart of information disclosure.

Step S5: In the disclosure conditions monitoring mode, if disclosure conditions are generated, for example, the unsealing part 30 receives a request for disclosure processing from the electronic information depositing part 20, confirms the identity of the depositor, check the validity of disclosure, and performs disclosure processing. Details of this processing are shown in FIG. 9. The relationship between this processing and the next processing is shown in FIGS. 10 and 12.

Step S6: Following unsealing processing, the recipient-specified delivery part 40 receives a request for disclosure from the unsealing part 30, selects recipients to whom deposit information is to be disclosed, determines disclosure means, and executes the disclosure (delivery) of the deposit information to the system to which information is made public 2 via the network 3 or any other designated means. Details of this processing are shown in FIG. 13. After this, the system returns to the state of Step S4.

This processing can be carried out twice for the entire system. To this end, the entire host processing system 10 can be duplexed. Consequently, the electronic information depositing part 20, for example, can also be duplexed so that a certain processing can be executed only when the calculation results of the two parts are matched. The memory 21 can also be duplexed. Thus, the reliability of the will information management and disclosure system can be improved.

FIG. 5 shows a processing flow of new membership registration executed by the electronic information depositing part 20.

Step S7: A contract for management of will information is concluded with a depositor by interacting with the depositor using the depositor's terminal 1 via the network 3, and the contents of the contract are registered in the contract details storage area 22.

Step 8: The membership information, such as name, address, etc., entered by the depositor from the depositor's terminal 1 via the network 3 is registered in the membership registration storage area 23.

Step 9: A uniquely determined membership number is given to a depositor. The membership number is registered in the membership registration storage area 23, and displayed on the depositor's terminal 1 via the network 3. Furthermore, a key for encryption as described with reference to FIG. 2 is notified to the depositor as the need arises.

Step S10: A password entered by the depositor from the depositor's terminal 1 via the network 3 is registered in the membership registration storage area 23.

FIG. 6 shows a depositing process flow according to the present invention executed by the electronic information depositing part 20.

Step S11: When the depositor enters deposit information, together with his/her membership number and password, from the depositor's terminal 1 via the network 3, whether the depositor who entered the deposit information has a valid membership at the time of entry is checked prior to registration/alteration. Whether the depositor has a valid membership can be confirmed not only by checking whether the membership number is correct by referring to the membership registration storage area 23, but also by checking whether maintenance fees are paid by referring to the maintenance, confirmation and management information storage area 26.

Step S12: If the depositor has not a valid membership, an alarm is issued and the processing is terminated. If maintenance fees are not paid by the depositor, the subsequent depositing procedures are refused, and the system is returned to the waiting for registration/alteration mode.

Step S13: If the depositor has a valid membership, then whether the password entered is correct is checked prior to registration/alteration. If it is not correct, Step S12 is executed. Thus, any unauthorized attempt to alter the deposit information by a person who does not know the correct password (other than the depositor) is refused, and the system is returned to the waiting for registration/alteration mode.

Step S14: The registration and/or alteration of deposit information is carried out in accordance with the input by the depositor from the depositor's terminal 1 via the network 3. The deposit information is stored in the deposit information storage area 24.

Step S15: The registration and/or alteration of disclosure information (disclosure conditions) is carried out in accordance with the input by the depositor from the depositor's terminal 1 via the network 3. The disclosure information is stored in the disclosure conditions setting, holding and storage area 25.

Step S16: The registration and/or alteration of disclosure means is carried out in accordance with the input by the depositor from the depositor's terminal 1 via the network 3. The disclosure means is stored in the deposit information storage area 24.

Step S17: The processing history is recorded in the disclosure processing storage area 28. As a result, the altered contents of the deposit information can be confirmed after the alteration.

To register deposit information, disclosure information or disclosure means, Steps S14 through S16 are executed. To change depositing information, disclosure information or disclosure means, only necessary steps out of Steps S14 through S16 are executed.

FIG. 7 shows a disclosure processing flow by the depositor.

Step S18: Whether a person who operates the depositor's terminal 1 is a member who enters into the contract is confirmed.

Step S19: Whether the registered contents of disclosure conditions or disclosure information (deposit information) have been changed is checked.

Step S20: Whether the disclosure processing agrees with the registered disclosure conditions.

Step S21: If agreement is confirmed, the information is disclosed in accordance with the designated disclosure method.

Figure 8:
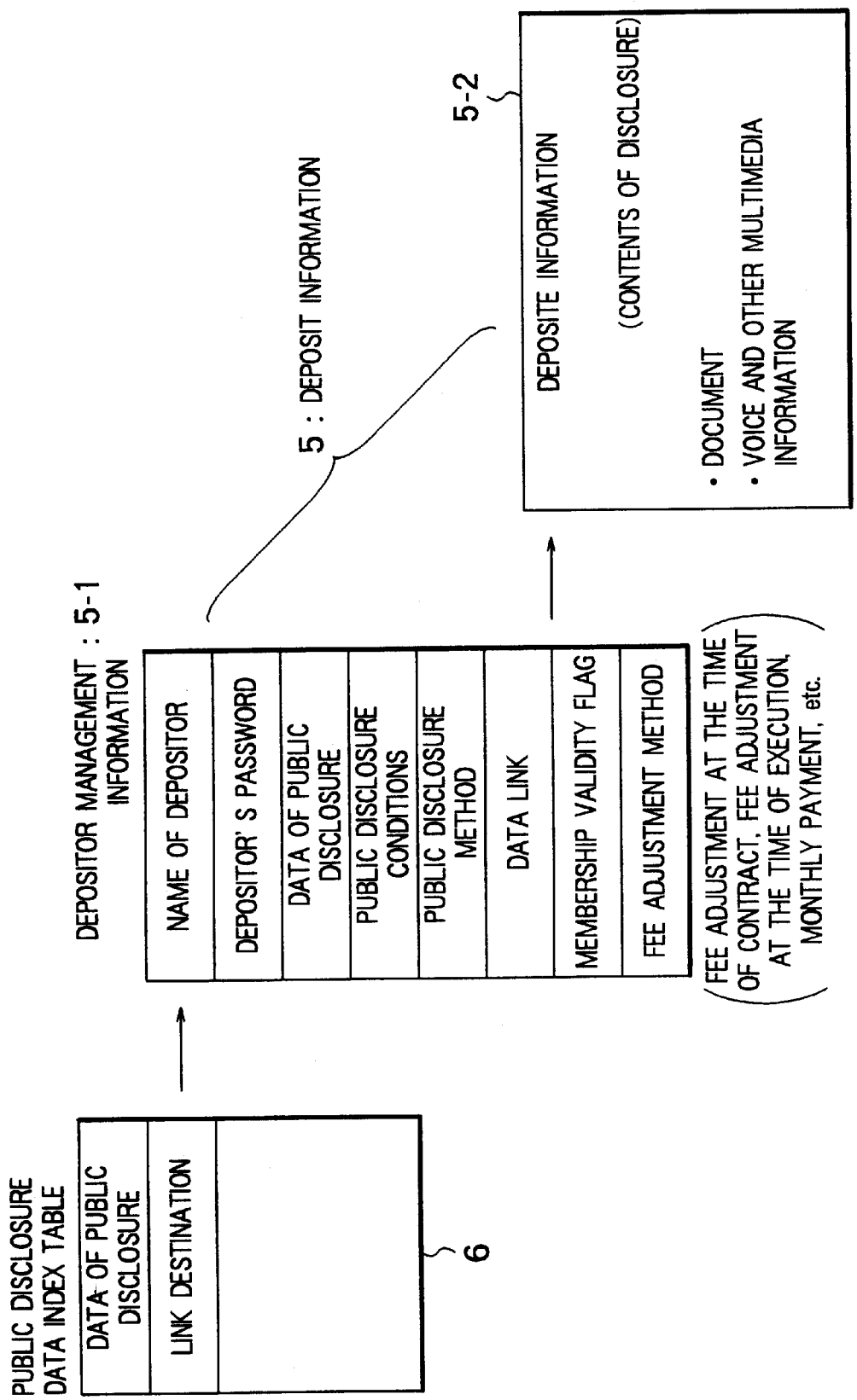
FIG. 8 is a diagram illustrating the state of access to deposited information.

FIG. 8 is a diagram illustrating the state of access to deposit information. In the figure, numeral 5 denotes deposit information. The deposit information 5 is such information as described above, and can be divided into depositor management information 5-1 and the contents of disclosure 5-2.

The depositor management information 5-1 may be considered as including the name, address and password of a depositor, the date of public disclosure (disclosure), public disclosure (disclosure) conditions, public disclosure (disclosure) methods, link information relating to the contents of disclosure 5-2, a flag showing whether the depositor has a valid membership, the method of disposal of adjustment fees, etc.

The contents of disclosure 5-2 are the very contents to be actually disclosed in the future and consist of text, video, audio and other multimedia information.

As to the time to disclose deposit information, there can be various cases; the deposit information is desired to be disclosed at the earliest possible date from the moment when the death of the depositor has been confirmed to the seventh day after the depositor's death on which a Buddhist memorial service is held, or after the lapse of a certain period, the forty-ninth day after the depositor's death on which a Buddhist memorial service is held, or the third or seventh anniversary of the depositor's death, or after the lapse of a few years. The date of disclosure is described in the public disclosure date index table 6 shown in FIG. 8, and link information to the depositor management information 5-1 corresponding to a depositor is also described in that table 6.

Once disclosure is determined, the date of public disclosure (disclosure) is monitored with an internal clock in the host processing system 10, and when the predetermined disclosure date is reached, the depositor management information 5-1 is accessed based on the link information. The contents of disclosure 5-2 is disclosed to a predetermined recipient(s) in accordance with the public disclosure (disclosure) conditions or the public disclosure (disclosure) method that have been registered in advance. That is, the contents of disclosure 5-2 are accessed based on the data link shown in the figure, and the contents to be disclosed are disclosed to the recipient(s) by checking the environment of each recipient.

FIG. 9 shows an unsealing processing flow executed by the unsealing part 30. Unsealing processing is executed automatically at a predetermined frequency, at noon every day, or at the start of business every day, for example. At this frequency, therefore, a request for unsealing is issued from the electronic information depositing part 20.

To enable such an unsealing processing, when a member's death is confirmed, the system operator enters the information on the death, together with his/her membership number, into the system as routine work. A member's death is confirmed when a notice of his/her death is received through an officially effective document, such as a death certificate, for example, or when his/her death is first estimated by the death detecting means that is specified in advance by the contract (when regular contact from the member is discontinued, for example) and then his/her death is confirmed by a follow-up study.

Upon receipt of the information on a member's death, the management information processing means 33 turns ON the unsealing flag corresponding to the membership number, or extracts the membership number on an extract table that is provided in advance. By doing this, the member whose deposit information is to be unsealed is differentiated from other members. The unsealing flag is stored in an unsealing flag storage area provided in advance in a memory managed by the memory 21 or the management information processing means 33, for example.

Step S22: The member who satisfies the unsealing conditions is retrieved. The membership number whose unsealing flag is turned ON by the second confirming means 32 is extracted.

Step S23: The validity of unsealing the information on the extracted member is checked. The unsealing conditions are checked as the second confirming means 32, for example, refers to the unsealing conditions setting, holding and storage area 25 (the public disclosure date index table 6 and the depositor management information 5-1).

Step S24: An alarm is issued if the unsealing is found not valid; for example, when the date of unsealing does not satisfy the unsealing conditions which prescribe that the information be unsealed (and disclosed) at the third anniversary of a member's death.

Step S25: The historical log is retrieved and stored in the unsealing record storage area 28. After that, Step S30 is executed.

Step S26: If unsealing is found valid, the password is checked by referring to the membership registration and setting storage area 23. If the entered password is not correct, Step S24 and the following steps are executed.

Step S27: If the entered password is correct, the deposit information 5-2 for that membership number in the deposit information storage area 24 is unsealed.

Step S28: A request for delivering the unsealed deposit information 5-2 is given to the recipient-specified delivery part 40 by designating the recipient(s) in accordance with the membership number.

Step S29: The historical log is retrieved and stored in the unsealing record storage area 28, for example.

Step S30: Whether processing for all members has been completed is checked. If not completed, Step S22 and the following steps are executed. If completed, the unsealing operations for that day is completed.

When the depositor him-/herself unseals the deposit information, authentication process is followed by the first confirming means 31, in place of the aforementioned Steps S22 and S23, and then Step S23 and the following steps are executed. By doing this, the validity of unsealing by the depositor him-/herself is established.

Even while the member is alive, the unsealing flag can be turned ON automatically at a date specified in advance in the contract. This allows the deposit information to be disclosed to a recipient(s) specified in advance in the contract by disclosure means specified in advance in the contract. The deposit information in such a case may include a congratulatory message on the birth of a recipient to whom the deposit information is to be disclosed, for example.

FIG. 10 shows a disclosure determination and disclosure processing flow.

Step S31: Whether a recipient(s) to whom the deposit information is to be disclosed exists is checked as a routine processing in the host processing system 10.

Step S32: When a death notification is received, or any other disclosure condition is generated, the depositor him-/herself is confirmed.

Step S33: Whether the deposit information to be disclosed belongs to a valid member is checked.

Step S34: If it belongs to a valid member, the deposit information for the depositor him-/herself is checked for disclosure conditions.

Step S35: If disclosure conditions are satisfied, the data (the contents of disclosure) is made public (disclosed) in accordance with a preregistered method.

Step S36: If disclosure is executed, a record of the disclosure is kept.

Step S37: Fee adjustment processing is executed in a prescribed manner.

FIG. 11 is a diagram of assistance in explaining the state of disclosure of information in accordance with the prescribed disclosure method.

The number of recipients to whom information is to be disclosed is described for each depositor. "Recipient 1," and "Recipient 1" as recipients, and "Disclosure condition 2," and "Disclosure 2" as disclosure conditions, and "Data link" to the public disclosure information description area 7-I for describing and preparing public disclosure information (information to be disclosed to the recipient(s) ) is described are prepared in advance for each recipient. A predetermined range of the public disclosure information is prepared in the public disclosure information description area 7-A or 7-B, and the public disclosure information is eventually completed in the area 7-A or 7-B at the time of disclosure. In disclosing the public disclosure information to a particular recipient, the contents of the area 7-A or 7-B are notified.

FIG. 12 shows a processing flow of disclosure.

Step S38: Whether disclosure conditions are met is checked.

Step S39: Which means is used to disclose information is checked.

Step S40: When information is disclosed as electronic information, the information is output on the display of the terminal of the recipient, for example.

Step S41: When information is disclosed via printed matter, the contents of the public disclosure information description area 7-A or 7-B are printed.

Step S42: Addresses of the recipients are printed on envelopes.

Step S43: Whether disclosure of the information to all the recipients has been completed is checked, and the entire processing is completed.

FIG. 13 shows a delivery processing flow executed by the recipient-specified delivery part 40.

Step S44: Recipients of the deposit information 5-2 for which a request to send is received from the unsealing part 30 are selected using the membership number. A recipient (the system to which information is made public 2, for example) is determined as the recipient selecting means 41 refers to the deposit information storage area 24, for example.

Step S45: The contents of disclosure are selected in the same manner. The contents of disclosure are determined as the contents selecting means 42 refers to the deposit information storage area 24, for example.

Step S46: Disclosure (delivery) means is selected in the same manner. Disclosure means is determined as the disclosure means selecting means 44 refers to the deposit information storage area 24, for example.

Step S47: The contents of disclosure determined in Step S45 are delivered to the recipients determined in Step S44 using the disclosure means determined in Step S46. The contents of a depositor's will are transmitted to a particular system to which information is disclosed 2 by electronic mail via the network 3.

FIG. 14 is a diagram of assistance in explaining the state where the mode of disclosure is controlled. The following are instructed to each recipient:

i. "Contents of public disclosure information" indicating what type of information is to be disclosed—whether only the existence/absence of information is notified, or the information proper (including the contents of deposit information) is notified is instructed.

ii. "Type of disclosure means" indicating what type of disclosure means is used to disclose information—whether information is disclosed in the form of printed matter or electronic information is instructed.

iii. "Delivery medium" indicating what type of medium is used to delivery information—in the case of printed matter, the use of mail service is instructed, and in the case of electronic information, the use of electronic mail, or facsimile, or other means is instructed.

iv. "Necessary information on recipients" indicating the information on recipients to whom information is delivered—addresses, the type of mail, ID numbers of recipients, facsimile numbers, etc. are instructed.

There are generally three types of testamentary document. The first is the holographic testamentary document. Pursuant to Article 968 of the Civil Code, i. A holographic testamentary document shall be a holographic document; with its entire text, the date of execution and the name of the testator hand-written, and his/her seal affixed.

ii. In adding, deleting or otherwise changing a testamentary document, the testator shall clearly indicate the places of such changes, append a note to the effect that addition, deletion or other changes were made, and affix his/her seal to the places.

The second is the officially authenticated testamentary document. Pursuant to Article 969 of the Civil Code, an officially authenticated testamentary document shall be executed iii. In the presence of two or more witnesses, iv. The testator shall dictate the purport of his/her will to a notary public, v. The notary public shall write down what the testator dictated to him, and read what he wrote to the testator and the witnesses, vi. Upon acknowledging the accuracy of the notary public's writing, the testator and the witnesses shall sign and seal the testamentary document (when the testator cannot sign the document, the notary public may omit the signature of the testator by describing the reason for the testator being unable to sign the document.)

vii. The notary public shall add a note that the testamentary document was duly executed through the aforementioned process, and sign and seal the testamentary document.

The third is a secret testamentary document, which shall be executed, pursuant to Article 970 of the Civil Code, conforming to the following requirements.

viii. The testator shall sign the document and affix his/her seal to it, ix. The testator shall seal the document and put on it his/her seal that is the same as affixed to the document.

x. The testator shall submit the sealed document before a notary public and two or more witnesses, and declare that the document is his/her own testamentary document, and the name and address of the author.

xi. The notary public shall record on the sealed document the date of submittal and the testator's declaration, sign and seal the sealed document, together with the testator and the witnesses.

xii. In adding, deleting or otherwise changing the secret document, the testator shall clearly indicate the places of addition, deletion or other change, append a note to the effect that addition, deletion or other changes were made, and affix his/her seal to the places.

The will information management and disclosure system according to the present invention is adapted to meet any of the aforementioned three types of testamentary document.

In the case of a holographic testamentary document, a depositor executes a testamentary document while interacting with the display screen of his/her own terminal, and merges a record with the date of execution and the name of the author written in his/her own handwriting and his/her seal affixed into the contents of the aforementioned testamentary document in the form of image information. Where his/her own handwriting is required for the entire text of the testamentary document, the handwritten entire text may be entered into the system in the form of image information.

In the form of an officially authenticated testamentary document, a notary public enters what the testator dictates into the depositor's terminal in the presence of two or more witnesses, prints and reads what is entered to the testator and the witnesses, and merges their respective signatures and seals into the contents of the testamentary document as image information. In such a case, arrangement is made so that the executed testamentary document is prevented from being accessed even by the depositor him-/herself without the presence of a notary public and witnesses. If the testament has to be added, deleted or otherwise changed, another copy of officially authenticated testamentary document may be executed in the same manner, and a statement may be appended to the effect that the previous testamentary document has been destroyed.

In the case of a secret testamentary document, the depositor enters the contents of testament, merges his/her signature and seal into the testamentary document as image information, seals the secret testamentary document (in an inaccessible manner), declares before a notary public and witnesses that the secret document is his/her own testament, and the notary public, the witnesses and the depositor merge their respective signatures and seals on the secret testamentary document into the sealed testamentary document as image information. In this case, too, the secret testamentary document, once executed, is prevented from being accessed even by the depositor him-/herself without the presence of the notary public and the witnesses.

Although the will information management and disclosure system according to the present invention can deal with the aforementioned three types of testamentary documents, as described above, the most distinguished characteristic of the will information management and disclosure system is that the depositor him-/herself can deposit information by operating the depositor's terminal and rewrite the information following predetermined procedures. In this respect, the holographic testamentary document is most likely to be preferred as the deposit information for the present invention. In this case, it is necessary to make some provisions for legal substantiation. Needless to say, the entered deposit information can be treated as a genuine testamentary document since the entered deposit information is entirely enciphered in the system and perfectly protected from unauthorized access by third parties except for the death of the depositor him-/herself. Unsealing of the deposit information after the death of the depositor requires the presence of a plurality witnesses of a predetermined legal capacity.

When the depositor has rewritten the deposit information, two versions of the deposit information before and after rewriting are left undeleted at least for a month, for example, and either thereof is removed as the need arises after the lapse of one month, thereby a possible rewriting forced by third parties can be prevented.

Figure 15:
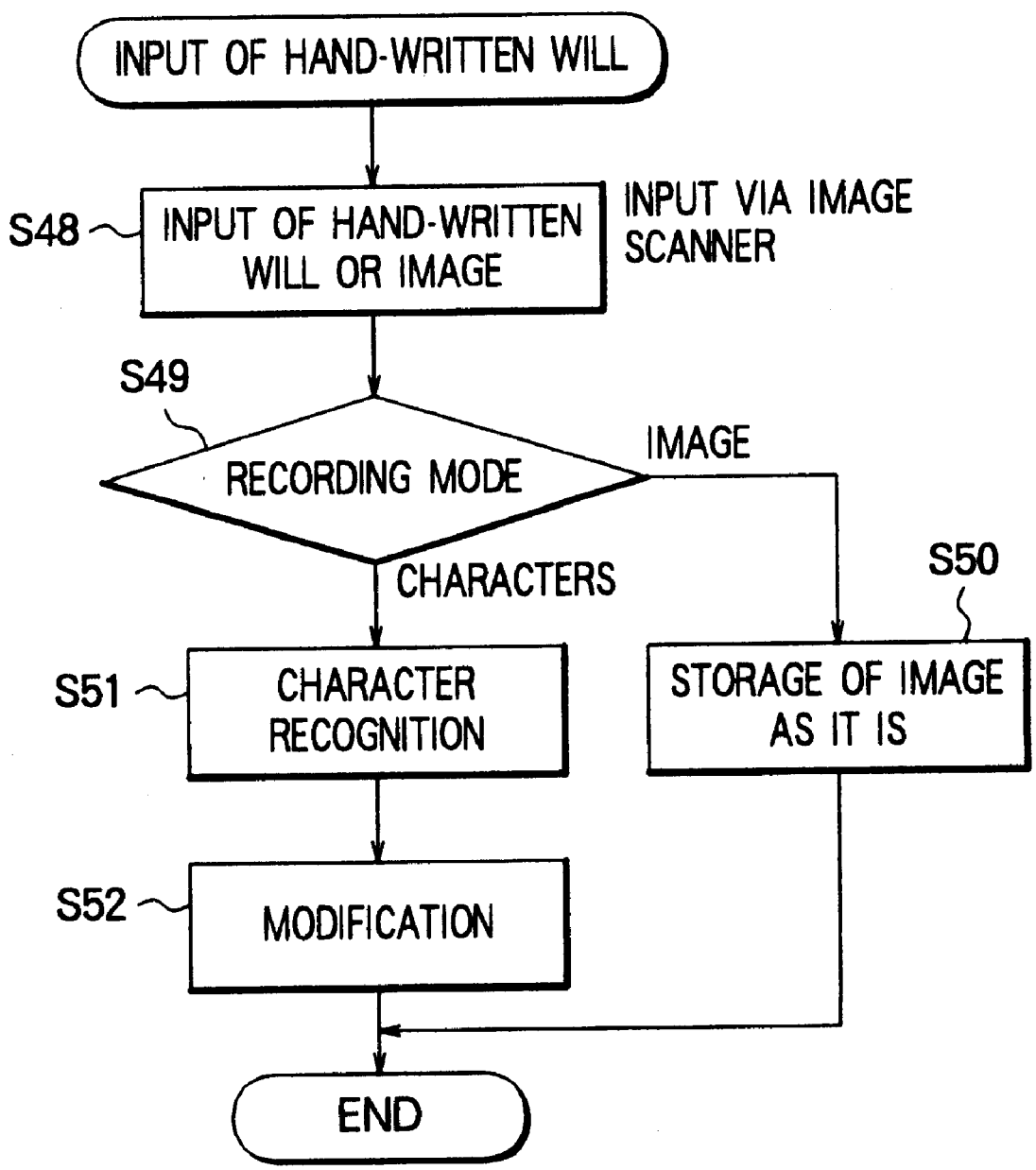
FIG. 15 is a flow chart of input processing of hand-written will information.

FIG. 15 shows an input processing flow of hand-written testamentary document. As described above, deposit information may be in any of character, image, or voice media, or in any combination of such media (multimedia information). The system according to the present invention is therefore constructed so that deposit information consisting of such information media can be entered with ease.

Step S48: A hand-written will text is entered as image data using a image scanner. Such image data is stored as it is in a predetermined storage area.

Step S49: The system determines how to store the information. To this end, the system asks the depositor to select appropriate input mode.

Step S50: When storing the information as image data, the fetched image data is stored as the deposit information 5-2 in the deposit information storage area 24.

Step S51: When storing the information as character data, the fetched image data is subjected to character recognition processing.

Step S52: The results of character recognition are amended appropriately. To achieve this, the system asks the depositor to amend the data for unrecognized or erroneously recognized characters, etc. The results of amendment are stored as the deposit information 5-2 in the deposit information storage area 24.

This processing is adopted as an input mode of deposit information, disclosure conditions, disclosure means. By doing this, any will that is legally required to be duly sealed can be managed by the system according to the present invention, as described above. In addition, what is dictated by a testator can be managed as it is by the system according to the present invention. Furthermore, only the character portion of a hand-written will can be stored as character data and the seal portion thereof as image data.

As described above, the will information management and disclosure system according to the present invention allows information, such as a will, to be deposited without exposure to third parties, for example, by keeping in custody deposit information, unsealing the deposit information under predetermined unsealing conditions, and disclosing the information to predesignated recipient(s). Disclosure of the deposit information when the depositor has become unable to express his/her intentions can be safely trusted to the data processing system.

The present invention can implement the aforementioned will information management and disclosure system using a computer operating program as described above, and the program can be stored in any of various program storage media suitable for storing it.

What is claimed is:

1. A will information management and disclosure system for keeping in custody deposit information deposited by a depositor and unsealing said deposit information under predetermined unsealing conditions, said deposit information including will information that is unsealed in accordance with unsealing conditions registered in advance by said depositor and/or when said depositor has become unable to express his/her intentions, and disclosed to a predetermined recipient, and said will information management and disclosure system comprises a host processing system and a depositor's terminal into which said depositor enters as electronic information said deposit information prepared by said depositor in a rewritable manner, said host processing system comprising:

an electronic information depositing part to keep in custody said entered electronic information in accordance with predetermined depositing conditions, said electronic information depositing part including a memory having an unsealing conditions setting and storing area for setting and storing conditions for unsealing said deposit information;

an unsealing part to unseal said deposit information using a predetermined unsealing electronic key, having a first confirming means for confirming the occurrence of said unsealing conditions, and a second confirming means for confirming that said depositor has become unable to express his/her intentions; and a recipient-specified delivery part to deliver said deposit information using predetermined means to a recipient who is designated in advance by said depositor and satisfies predetermined conditions, wherein communications between said host processing system and said depositor's terminal, and the processing of information prior to unsealing by said host processing system are carried out by enciphered electronic information, wherein said unsealing part unseals said deposit information in a case that at least one of the first confirming means and second confirming means confirms the occurrence of the unsealing condition or that the depositor has become unable to express the intention.

2. A will information management and disclosure system as in claim 1, further comprising communication means between said host processing system and said depositor's terminal, wherein said deposit information prepared by said depositor in a rewritable manner with a view to depositing to said system is entered via said depositor's terminal only after a membership contract has been concluded via said communication means between said host processing system and said depositor's terminal.

3. A will information management and disclosure system as in claim 2 wherein communications take place via the Internet between said host processing system and said depositor's terminal.

4. A will information management and disclosure system as in claim 1 wherein said depositor's terminal comprises authentication means for identifying and authenticating said depositor.

5. A will information management and disclosure system as in claim 1 wherein said depositor's terminal identifies said depositor via communication means between said depositor' terminal and host processing system.

6. A will information management and disclosure system as in claim 1 wherein said deposited electronic information comprises any of character, image or voice, or multimedia information of any combination of character, image and voice media.

7. A will information management and disclosure system as in claim 1 wherein said deposit information is information including at least one of said depositor's autobiography and unpublished information prepared before said depositor's death.

8. A will information management and disclosure system as in claim 1 wherein said deposit information further comprises an authenticating expression for identifying the genuineness of said deposit information as prepared by said depositor.

9. A will information management and disclosure system as in claim 8 wherein said authenticating expression comprises at least one of image information on an identification certificate of said depositor, electronic seal information corresponding to said depositor's identification seal, image information on said depositor's autograph.

10. A will information management and disclosure system as in claim 2 wherein said electronic information depositing part comprises a memory storage area to store the content of said contract, the contents of membership registration settings, and said deposit information.

11. A will information management and disclosure system as in claim 1 wherein said electronic information depositing part comprises a memory including a maintenance, confirmation and management information storage area for describing the process of storing said deposit information.

12. A will information management and disclosure system as in claim 11 wherein said electronic information depositing part comprises a maintenance, confirmation and management information storage area validation means for managing the validity of said maintenance, confirmation and management information storage area.

13. A will information management and disclosure system as in claim 1 wherein said electronic information depositing part comprises a memory including an unsealing record storage area for storing a record describing the process of unsealing said deposit information.

14. A will information management and disclosure system as in claim 1 wherein said electronic information depositing part comprises a memory including a contract details storage area for describing the details of processing on contract performance in accordance with the contents of said contract.

15. A will information management and disclosure system as in claim 1 wherein at least one of said first confirming means and said second confirming means comprises management information processing means for receiving and recording management information based on an official certificate or a doctor's certificate on the physical condition of said depositor.

16. A will information management and disclosure system as in claim 1 wherein at least one of said first confirming means and said second confirming means comprises a check initiating means for initiating a function for confirming and checking the physical conditions of said depositor to cope with a state where said depositor has not operated said depositor's terminal beyond a predetermined period of time.

17. A will information management and disclosure system as in claim 1 wherein said electronic key used in said unsealing part comprises at least one of an ID information, a password and password information of said depositor.

18. A will information management and disclosure system as in claim 1 wherein said unsealing part has a function to perform fee adjustment for information depositing business and a function to nullify unsealing operation carried out using said electronic key.

19. A will information management and disclosure system as in claim 1 wherein said recipient-specified delivery part has a function to select recipients to which said deposit information is disclosed in accordance with designation by said depositor.

20. A will information management and disclosure system as in claim 1 wherein said recipient-specified delivery part has a function to select and notify part or whole of said deposit information in accordance with predetermined designation and/or a function to notify the presence/absence of deposit information.

21. A will information management and disclosure system as in claim 1 wherein said recipient-specified delivery part has a function to select the mode of delivery to said recipients by judging the environment of said recipients.

22. A will information management and disclosure system as in claim 1 wherein said recipient-specified delivery part has a function to select disclosure means to said recipients.

23. A will information management and disclosure system as in claim 1 wherein a reference information library including judiciary cases and/or cases and/or said depositor's posthumous works that are helpful for said depositor to deposit said deposit information, and a function for said depositor to refer to said library via said depositor's terminal.

24. A will information management and disclosure system as in claim 1 wherein a members' mail consultation service through which said depositor can obtain advice helpful in depositing said deposit information.

25. A will information management and disclosure method for keeping in custody deposit information deposited by a depositor and unsealing said deposit information under predetermined unsealing conditions, said deposit information including will information that is unsealed in accordance with unsealing conditions registered in advance by said depositor and/or when said depositor has become unable to express his/her intentions, and disclosed to a predetermined recipient, and said will information management and disclosure method comprising:

entering as electronic information said deposit information prepared by said depositor in a rewritable manner with a view to depositing via a depositor's terminal;

a host processing system storing said entered electronic information in accordance with predetermined depositing conditions;

unsealing said deposited information using a predetermined unsealing electronic key in response to confirming the occurrence of said predetermined unsealing conditions, or in response to said depositor becoming unable to express his/her intentions;

delivering said deposit information for disclosure using predetermined means to a recipient designated in advance by said depositor and satisfying predetermined conditions;

communicating between said host processing system and said depositor's terminal, and processing information prior to unsealing by said host processing system using enciphered electronic information; and setting and storing conditions for unsealing said deposit information in a memory of said electronic information depositing part.

26. A will information management and disclosure method as in claim 25 wherein said deposit information prepared by said depositor in a rewritable manner with a view to depositing to the system is accepted by said host processing system through authenticating procedures for identifying said depositor.

27. A will information management and disclosure method as in claim 25 wherein said deposit information includes, together with the contents of said deposit information, an identification expression for identifying the genuineness of said deposit information as prepared by said depositor.

28. A will information management and disclosure method as in claim 25 wherein in said information depositing step, deposit information is stored in relation to the contents of the contract concluded before said depositor deposits information, and said depositor information is stored in relation to any one or any combinations of unsealing conditions for unsealing said deposit information, a description describing the step of storing said deposit information, a record describing the unsealing of said deposit information, and a record of the processing of contract execution based on the contents of said contract.

29. A will information management and disclosure method as in claim 25 wherein in said unsealing step, deposit information is stored in relation to a record describing fee adjustment processing for said depositing business, and a description describing the validity or invalidity of the storage of said deposit information.

30. A will information management and disclosure method as in claim 25 wherein said delivery step, said deposit information is disclosed to recipients designated in advanced by said depositor, in part or whole as designated in advance by said depositor, in accordance with a method designated in advance by said depositor after the environmental condition of said recipients designated in advance by said depositor is judged.

31. A will information management and disclosure method as in claim 25 wherein said depositor refers to a reference information library containing judicial precedents and/or cases and/or posthumous works provided in said host processing system.

32. A will information management and disclosure method as in claim 25 wherein said depositor uses a members' mail consultation service provided in said host processing system via said depositor's terminal.

33. A program storage medium for storing programs for realizing a will information management and disclosure method that keeps in custody deposit information deposited by a depositor and unseals said deposit information under predetermined unsealing conditions, said deposit information including will information that is unsealed in accordance with unsealing conditions registered in advance by said depositor and/or when said depositor has become unable to express his/her intentions, and disclosed to a predetermined recipient, and said will information management and disclosure method comprising:

entering as electronic information said deposit information prepared by said depositor in a rewritable manner with a view to depositing via a depositor's terminal;

a host processing system storing said entered electronic information in accordance with predetermined depositing conditions;

unsealing said deposited information using a predetermined unsealing electronic key in response to confirming the occurrence of said predetermined unsealing conditions, or in response to said depositor becoming unable to express his/her intentions;

delivering said deposit information for disclosure using predetermined means to a recipient designated in advance by said depositor and satisfying predetermined conditions;

communicating between said host processing system and said depositor's terminal, and processing information prior to unsealing by said host processing system using enciphered electronic information; and setting and storing conditions for unsealing said deposit information in a memory of said electronic information depositing part.

* * * * *

UNITED STATES PATENT AND TRADEMARK OFFICE
CERTIFICATE OF CORRECTION

PATENT NO. : 6,246,991 B1
DATED : June 12, 2001
INVENTOR(S) : Yukinobu Abe et al.

It is certified that error appears in the above-identified patent and that said Letters Patent is hereby corrected as shown below:

<u>Title page,</u>
Item [73] Assignee, change "Kahoku-gun" to -- Ishikawa --.

<u>Column 17,</u>
Line 28, after "seal," add -- and --.

<u>Column 19,</u>
Line 23, change "depositor" to -- deposit --.

Signed and Sealed this

Second Day of April, 2002

Attest:

*Attesting Officer*

JAMES E. ROGAN
*Director of the United States Patent and Trademark Office*